US005902039A

United States Patent [19]

Futami

[11] Patent Number: 5,902,039

[45] Date of Patent: May 11, 1999

[54] PROJECTOR TYPE HEADLAMP

[75] Inventor: Takashi Futami, Tokyo, Japan

[73] Assignee: Stanley Electric Co., Ltd., Tokyo, Japan

[21] Appl. No.: 08/969,476

[22] Filed: Nov. 13, 1997

[30] Foreign Application Priority Data

Nov. 14, 1996 [JP] Japan .................................... 8-303000
Aug. 1, 1997 [JP] Japan .................................... 9-207718

[51] Int. Cl.[6] ........................................................ B60Q 1/00

[52] U.S. Cl. ........................... 362/539; 362/538; 362/305

[58] Field of Search ..................................... 362/538, 539, 362/303, 305

[56] References Cited

U.S. PATENT DOCUMENTS 4,800,467 1/1989 Lindae et al. ........................... 362/539
4,825,343 4/1989 Nakata .................................... 362/539

*Primary Examiner*—Stephen Husar
*Attorney, Agent, or Firm*—Weingarten, Schurgin, Gagnebin & Hayes LLP

[57] ABSTRACT

A projector type headlamp comprises expansion reflecting mirrors having an elliptic reflecting surface which has a first focus where a light source is provided and a second focus close to a projection lens and which is provided above a horizontal line passing through an optical center line between a main reflecting mirror and the projection lens and an auxiliary reflecting mirror having a parabolic reflecting surface which has a focus where the light source is provided and which is provided outside the projection lens. The width of a light distribution is expanded by the expansion reflecting mirrors and a spot high-illuminance portion is generated in the light distribution by the auxiliary reflecting mirror to expand a field of view.

4 Claims, 4 Drawing Sheets

PROJECTOR TYPE HEADLAMP

BACKGROUND OF THE INVENTION

1. Field of the Invention

The present invention relates to a headlamp or an auxiliary headlamp for a vehicle and, more specifically, to a projector type headlamp which employs an elliptic reflection surface such as a composite elliptic surface.

2. Background Art

FIG. 7 shows the configuration of a conventional projector type headlamp 90. The projector type headlamp 90 has a reflecting mirror 92 having a complex elliptic surface and a first focus where a light source 91 such as a tungsten halogen lamp is provided, and a shade 93 near a second focus of the reflecting mirror 92 is provided. In front of the shade 93, there is provided a projection lens 94 whose focus is in the vicinity of the shade 93.

The light source 91, the reflecting mirror 92 and the projection lens 94 are arranged such that their centers are aligned with an optical center line (an optical axis) Z of the projector type headlamp 90 and the shade 93 is arranged such that an upper end thereof is substantially aligned with the optical center line Z.

In the thus formed projector type headlamp 90, since light converges as an elliptic pencil of rays having such a cross section which is wider in a horizontal direction at the second focus by the reflecting mirror 92, a portion of light unnecessary from a viewpoint of light distribution characteristics is shaded by the shade 93 to shape the pencil of rays and the shaped pencil of rays is projected in a radiation direction by the projection lens 94.

FIG. 8 shows an example of light distribution characteristics QDP obtained by the projector type headlamp 90 configured as described above in which the cross section of the pencil of rays whose lower half portion is shaded by the shade 93 is inverted upside down by the projection lens 94 and projected. At this point, to facilitate the confirmation of a road shoulder side, a road illuminating portion DPL which rises at an angle of 15° to the left from the center of the light distribution characteristics is provided by the shape of the shade 93 when this headlamp 90 is for passage on the left.

The light distribution characteristics QDP show the actual measurement values of the projector type headlamp 90 which uses a 55W tungsten halogen lamp as the currently used light source 91 and the total quantity of light for generating the light distribution characteristics QDP is substantially 485 lumen and the maximum luminous intensity is 21,800 candela.

However, in the conventional projector type headlamp 90 described above, firstly, since a light quantity distribution in the direction of the cross section of the pencil of rays is determined by the characteristics of the reflecting mirror 92 and a relatively uniform brightness distribution is obtained from an elliptic reflecting surface such as the above-described complex elliptic surface, illuminance in a front direction of an automobile becomes not so high due to light distribution characteristics, thereby lowering the remote visibility.

Secondly, in this projector type headlamp 90, since a light emitting portion which can be seen from the outside when the headlamp lights up is only the projection lens 94, the portion has an extremely small area, and light radiated from the projection lens 94 has strong directivity, the visibility of the outside at night deteriorates. Further, thirdly, since an opening portion is only the projection lens 94 having a small area, external light hardly enters therein, and the projection lens 94 appears black and looks like a hole during daytime when the headlamp does not light up with the result that it mars the appearance of the headlamp. Solutions to these problems are awaited.

SUMMARY OF THE INVENTION

As means for solving the above problems of the prior art, the present invention provides a projector type headlamp comprising a light source, an elliptic main reflecting mirror, a shade and a projection lens, wherein elliptic expansion reflecting mirrors having an elliptic reflecting surface which has a first focus where the light source is provided and a second focus closer to the projection lens than the second focus of the main reflecting mirror is provided at a range of 5 to 45° above a horizontal line passing through an optical center line between the main reflecting mirror and the projection lens. The present invention further provides a projector type headlamp wherein an auxiliary reflecting mirror having a parabolic reflecting surface which has a focus in the light source and a radiation direction which is almost horizontal is provided in a portion devoid of the expansion reflecting mirrors and outside the outer periphery of the projection lens between the vicinities of the ends of the main reflecting mirror and the projection lens.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

Figure 1:
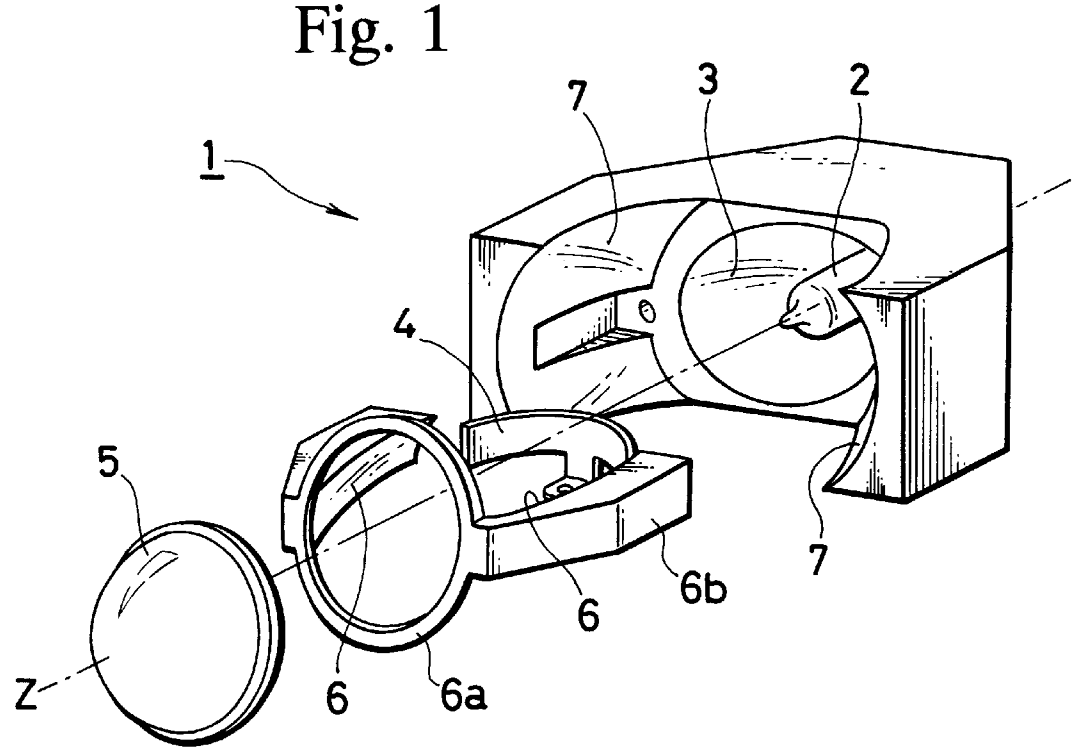
FIG. 1 is a partially exploded perspective view of a projector type headlamp according to an embodiment of the present invention.

The present invention is described in detail with reference to a preferred embodiment shown in the accompanying drawings. Denoted by 1 in FIG. 1 is a projector type headlamp according to the present invention (to be referred to as "headlamp 1" hereinafter). Like the prior art, this headlamp 1 comprises a light source 2 such as a halogen lamp, a main reflecting mirror 3 having a complex elliptic surface, a shade 4 and a projection lens 5.

The mutual positional relationship among the light source 2, the main reflecting mirror 3, the shade 4 and the projection lens 5 is the same as that of the prior art. Therefore, the same light distribution characteristics as those of the prior art can be obtained from the above configuration and their detailed descriptions are omitted here.

Figure 2:
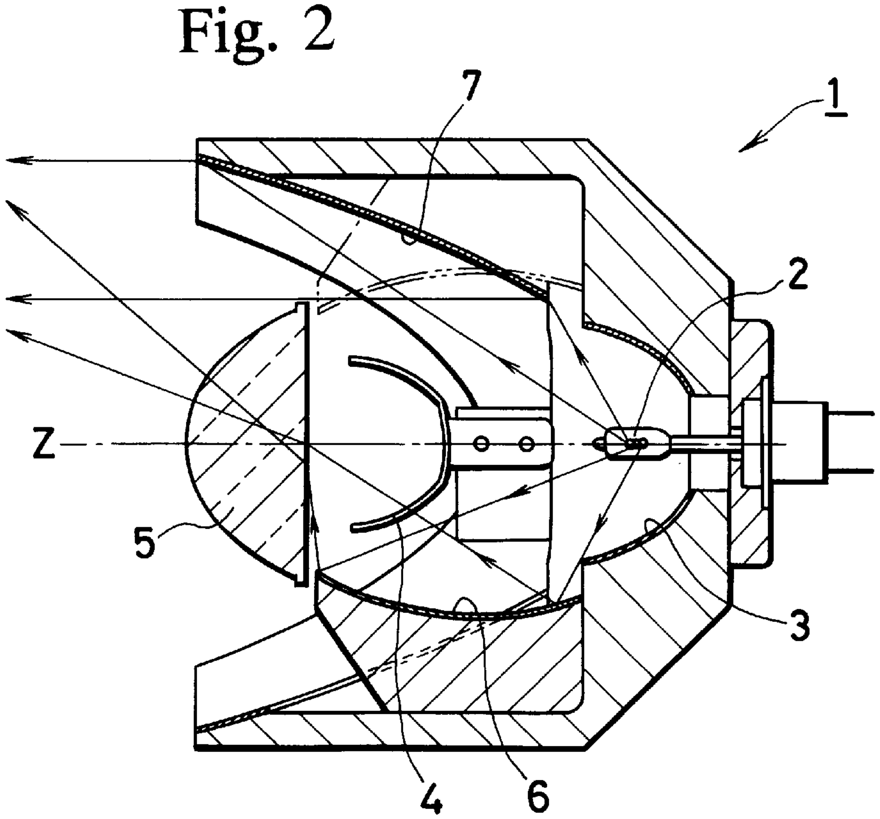
FIG. 2 is a diagram for explaining the arrangement of the reflecting mirrors of a projector type headlamp according to the present invention.
Figure 3:
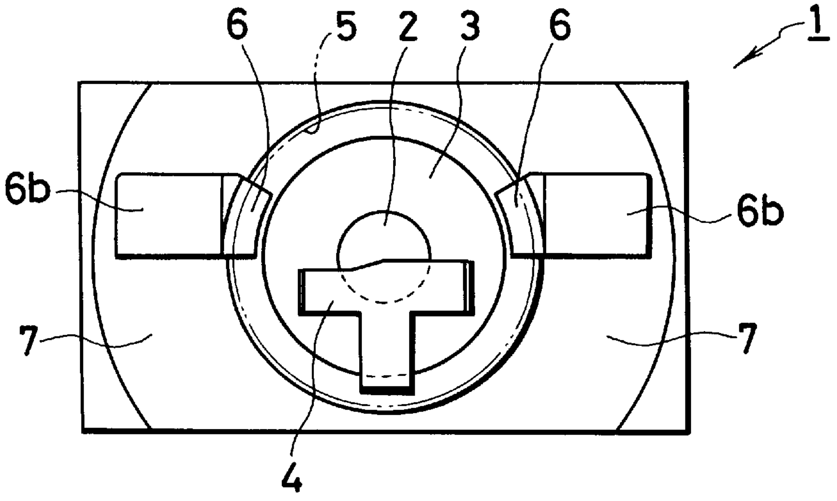
FIG. 3 is a diagram for explaining the arrangement of reflecting mirrors seen from the top of the headlamp.

In the present invention, as shown in FIGS. 2 and 3, a pair of expansion reflecting mirrors 6 which are bisymmetrical with each other are provided between the main reflecting mirror 3 and the projection lens 5. The expansion reflecting mirrors 6 are located above a horizontal line passing through an optical center line Z and an angular range thereof is 5 to 45° above from the horizontal line with the optical center line Z as a center.

The expansion reflecting mirrors 6 are formed as an elliptic reflecting surface such as a rotary elliptic surface. The first focuses of the expansion reflecting mirrors 6 are located at the light source 2 and the second focuses thereof are closer to the projection lens 5 than the second focus of the main reflecting mirror 3, preferably formed in the vicinity of the surface on the light source 2 side of the projection lens 5.

As the focuses of the expansion reflecting mirrors 6 are located as described above, the interval between the pair of expansion reflecting mirrors 6 is small on the projection lens 5 side and large on the main reflecting mirror 3 side, that is, small on the radiation side. In a regular reflecting mirror forming method, the pair is reversely tapered.

Since the expansion reflecting mirrors 6, as described above, extend in the vicinity of the surface on the light source 2 side of the projection lens 5, a lens holder portion 6*a* for attaching the projection lens 5 is formed in end portions on the radiation side of the expansion reflecting mirrors 6 to integrate the pair of expansion reflecting mirrors 6. The light source 2 side of the integrated unit is formed as a pull direction when releasing it from a mold, and the main reflecting mirror 3 and an auxiliary reflecting mirror 7 which will be described hereinafter may be attached thereto by screws.

In the present invention, the auxiliary reflecting mirror 7 is provided in addition to the expansion reflecting mirrors 6 and extends from the main reflecting mirror 3 to the vicinity of an end on the radiation side of the projection lens 5 except for the locations of the expansion reflecting mirrors 6 and a strut portion 6*b* for providing the expansion reflecting mirrors 6 and a portion covered by the projection lens 5.

The above-described auxiliary reflecting mirror 7 is formed as a parabolic reflecting surface such as a rotary parabolic surface and the focus thereof is set at the light source 2. Since a portion covered by the projection lens 5 is excluded as described above, the minimum diameter of this auxiliary reflecting mirror is made equal to or larger than the outer diameter of the projection lens 5.

Although the radiation direction of the auxiliary reflecting mirror 7 may be a front direction, when the headlamp 1 is for passage on the left, it is inclined to the left at about 0.5 to 1° and downward at about 0.5 to 1°, which is preferred from a viewpoint of preventing a driver's eyes from being dazzled by a vehicle running in the opposite direction.

Since the auxiliary reflecting mirror 7 is formed as a parabolic reflecting surface such as a rotary parabolic surface having a focus in the light source 2, the inner diameter thereof increases towards the radiation direction, whereby the pull direction thereof is the same as that of the main reflecting mirror 3 and hence, the both reflecting mirrors are formed integrally.

As described above, the expansion reflecting mirrors 7 which are formed as a separate integrated unit and to which the projection lens 5 is attached are installed on the main reflecting mirror 3 by screws to be integrated with each other, thereby constructing the headlamp 1 of the present invention. Generally, this type of headlamp 1 is not subjected to lens cutting and is provided with a cover lens (not shown) having no optical function.

Figure 4:
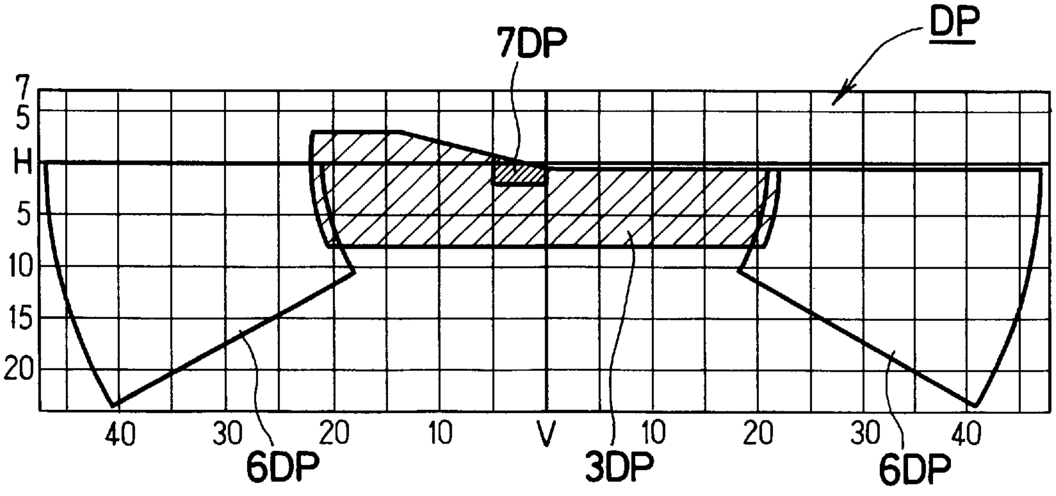
FIG. 4 is a diagram showing a technique of forming the light distribution characteristics of a projector type headlamp according to the present invention.

A description is subsequently given of the function and effect of this headlamp 1 of the present invention. FIG. 4 shows typically light distribution characteristics DP obtained by the headlamp 1 of the present invention. In the light distribution characteristics DP, light from the main reflecting mirror 3 produces a light distribution 3DP similar to that of the prior art.

In contrast, since the expansion reflecting mirrors 6 have no central portion and the second focuses thereof are located close to the projection lens 5, light is projected separately onto a side opposite to the side where each of the reflecting surfaces is provided as shown by an optical path in FIG. 2 and inverted upside down at the same time. Therefore, the light becomes a light distribution 6DP which is shaped like a fan below the horizontal line H and outside the light distribution 3DP from the main reflecting mirror 3 as shown in FIG. 4.

When the location of the second focus of the expansion reflecting mirrors 6 is moved over the optical center line Z at this point, the light distribution 6DP moves over the light distribution characteristics DP in a horizontal direction. Therefore, the light distribution 3DP from the main reflecting mirror 3 and the light distribution 6DP from the expansion reflecting mirrors 6 are connected to each other by locating the second focus of the expansion reflecting mirrors 6 at an appropriate position.

The auxiliary reflecting mirror 7 radiates light from the light source 2 in a radiation direction as a parallel light beam as it is formed as a parabolic reflecting surface. In this respect, this parallel beam is directly radiated to the outside as shown by an optical path of FIG. 2 without contacting the projection lens 5 because the minimum diameter of the auxiliary reflecting mirror 7 is made larger than that of the projection lens 5.

Therefore, light from the auxiliary reflecting mirror 7 generates a spot light distribution 7DP in a radiation direction set in the auxiliary reflecting mirror 7 over the light distribution characteristics DP (see FIG. 4). The radiation direction set in the auxiliary reflecting mirror 7 should be in contact with the left side of a vertical line V of the light distribution characteristics DP and the under side of the horizontal line H when the headlamp 1 is for passage on the left, which is preferred from a viewpoint of illuminating a distance and preventing a driver's eyes from being dazzled with a vehicle running in the opposite direction.

Figure 5:
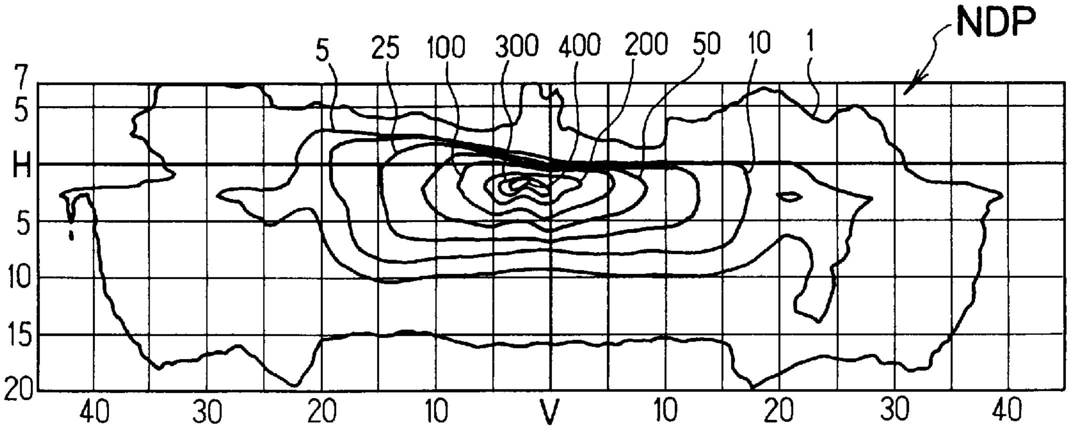
FIG. 5 is a graph showing the light distribution characteristics of a projector type headlamp according to the present invention.

FIG. 5 shows the actual light distribution characteristics NDP of the headlamp 1 of the present invention. Since the main reflecting mirror 3 having the same structure as that of the prior art, the expansion reflecting mirrors 6 and the auxiliary reflecting mirror 7 using a portion of light from the light source 2 not used by the main reflecting mirror 3 are formed in the headlamp 1, the total light pencil use efficiency of the headlamp 1 with respect to the light source 2 is increased by substantially 35% from 485 lumen to 650 lumen. Therefore, it is possible to form a brighter headlamp 1.

Since the light distribution 3DP is a projection image produced by the projection of a pencil of rays from the elliptic main reflecting mirror 3 by the projection lens 3, there is a limit to the width of the light distribution in a horizontal direction. In the present invention, the expansion reflecting mirrors 6 are provided to compensate for the shortage of the width in a horizontal direction, thereby making it possible to expand a field of view substantially to 1.4 times from 25° to 35° in a horizontal direction, Further, the auxiliary reflecting mirror 7 which is a parabolic reflecting surface is provided to project a spot light distribution in a front direction, whereby a brightness distribution is made relatively uniform and the maximum luminous intensity which causes insufficient remote visibility is substantially doubled from 21,800 to 47,600 candela, thereby making it possible to improve the remote visibility.

By providing the auxiliary reflecting mirror 7, the light emission area at the time of lighting is expanded, and the visibility at night is improved. In addition, external light entering from the auxiliary reflecting mirror 7 is reflected upon the main reflecting mirror 3, expansion reflecting mirrors 6 and auxiliary reflecting mirror 7 and passes through the projection lens 5 and is radiated to the outside again, and the projection lens 5 is prevented from appearing dark like a cave during daytime.

Figure 6:
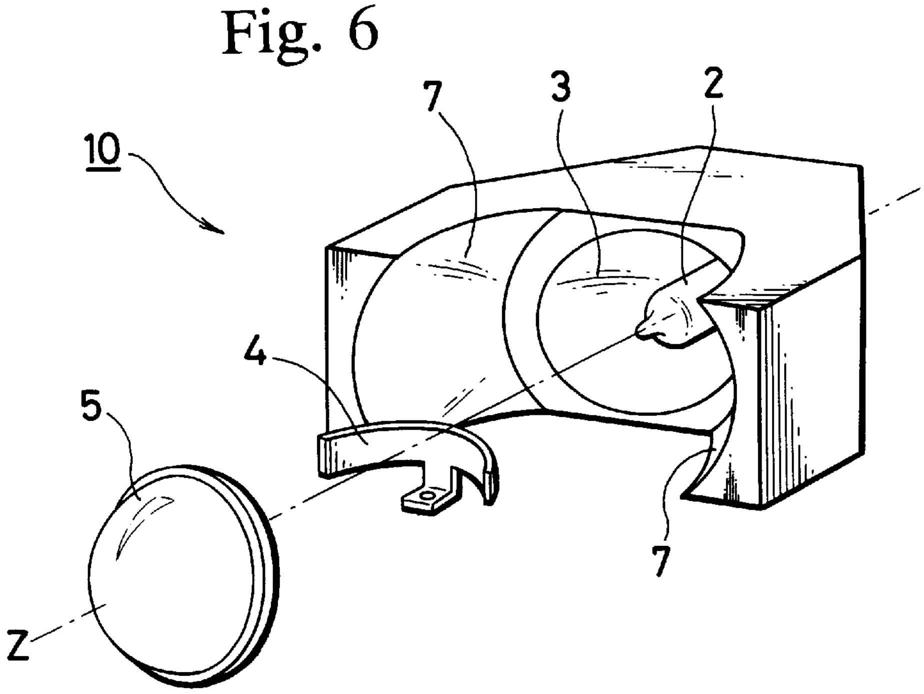
FIG. 6 is a partially exploded perspective view of a projector type headlamp according to another embodiment of the present invention.
Figure 7:
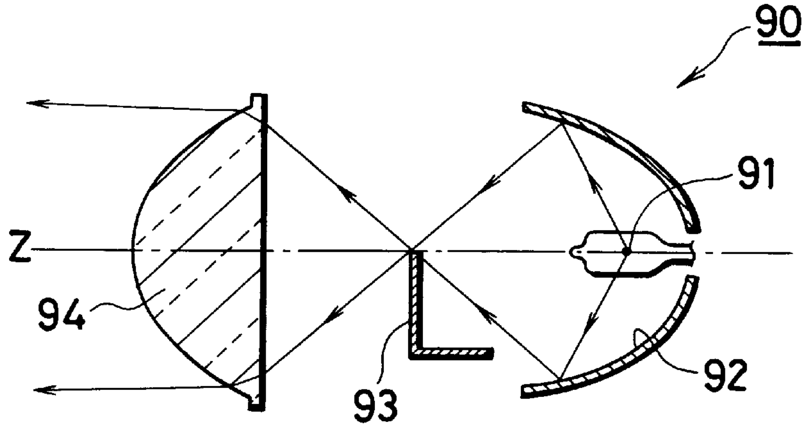
Fig. 7 Prior Art
FIG. 7 is a sectional view of a projection type headlamp of the prior art.
Figure 8:
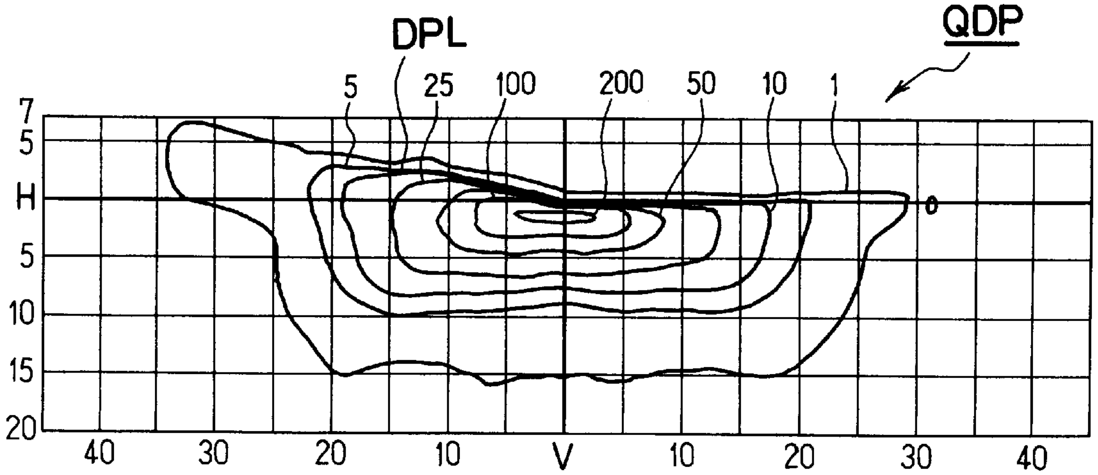
Fig. 8 Prior Art
FIG. 8 is a graph showing the light distribution characteristics of a projection type headlamp of the prior art.

Another embodiment of the present invention is shown in FIG. 6. It is apparent from the foregoing description that all effects above-described, the effect for increasing a visibility from a vehicle running in the opposite direction due to the increase of a light emission area, the effect for allowing a remote visibility to be increased by roughly doubling the maximum luminous intensity, and the effect for preventing the projection lens 5 from appearing dark like a cave during daytime, can be obtained by providing the auxiliary reflecting mirror 7 in this embodiment. Therefore, it is understood that the performance of the headlamp of the present embodiment can be remarkably improved.

Thus, expansion reflecting mirrors 6 are omitted in the head lamp 10 of this embodiment which has the auxiliary reflecting mirror 7. It is practically sufficient, even if the expansion reflecting mirrors 6 are omitted such as the present embodiment, for obtaining above-described effects when a wide radiation area in a horizontal direction on both sides is not particularly required for the headlamp 10, for example when a lamp such as an auxiliary headlamp (or fog lamp) which has a wide radiation area in a horizontal direction on both sides has already mounted on a vehicle.

In manufacturing a headlamp of the foregoing embodiment, the main reflecting mirror 3 and the auxiliary reflecting mirror 7 can be formed as an integrated body as described in the first embodiment. Therefore, the number of parts, the number of manufacturing steps, and the like do not substantially increase, which in turn allows the performance, such as the remote visibility, of the head lamp to be improved without raising manufacturing costs.

As described above, according to the present invention, since a projector headlamp is configured such that expansion reflecting mirrors having an elliptic reflecting surface which has a first focus where a light source is provided and a second focus closer to a projection lens than the second focus of the main reflecting mirror is provided at a range of 5 to 45° above from a horizontal line passing through an optical center line between the main reflecting mirror and the projection lens and that an auxiliary reflecting mirror having a parabolic reflecting surface which has a focus in the light source is provided outside the outer periphery of the projection lens between the vicinities of the ends of the main reflecting mirror and the projection lens, firstly, the light pencil use efficiency thereof with respect to the light source is improved by forming the expansion reflecting mirrors and the auxiliary reflecting mirror in an used portion of light from the light source, thereby making it possible to form a brighter headlamp with the same light source.

Secondly, in a projector type headlamp in which it is difficult to expand a light distribution in a horizontal direction in particular, the above structured expansion reflecting mirrors are provided to connect a light distribution from the expansion reflecting mirrors to right and left ends of a light distribution from the main reflecting mirror to expand the width of the light distribution, thereby improving a driving field of view.

Thirdly, in a projector type headlamp in which it is difficult to generate a high-illuminance portion in light distribution characteristics and to obtain the remote visibility thereby, the above structured auxiliary reflecting mirror is provided to generate a spot high-illuminance portion in a light distribution from the main reflecting mirror, thereby improving the visibility of a long distance.

Further, the light emission area of the projector type headlamp at the time of lighting is expanded by the auxiliary reflecting mirror, visibility from a vehicle running in the opposite direction at night is improved, light is caused to enter the rear of the projection lens by the auxiliary reflecting mirror during daytime to make it appear bright and prevent it from appearing like a dark cave, thereby producing no sense of incompatibility and improving the outer appearance of the headlamp.

Moreover, according to a headlamp of the present invention, which has an auxiliary reflecting mirror but no expansion reflecting mirror, the effect for increasing a visibility in the night-time from a vehicle running in the opposite direction or the like due to the increase of a light emission area, the effect for allowing a remote visibility to be increased by roughly doubling the maximum luminous intensity, and the effect for preventing the projection lens from appearing dark like a cave during daytime, can be obtained. Therefore, it is understood that the performance of the headlamp of the present invention can be remarkably improved.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A projector type headlamp comprising a light source, an elliptical main reflecting mirror, a shade and a projection lens, wherein expansion reflecting mirrors having an elliptic reflecting surface which has a first focus where the light source is provided and a second focus closer to the projection lens than the second focus of the main reflecting mirror is provided at a range of 5 to 45° above a horizontal line passing through an optical center line between the main reflecting mirror and the projection lens.

2. A projector type headlamp according to claim 1, wherein an auxiliary reflecting mirror having a parabolic reflecting surface which has a focus where the light source is provided and a radiation direction which is almost horizontal is provided in a position devoid of the expansion reflecting mirrors and outside the outer periphery of the projection lens and extends from the main reflecting mirror to the vicinity of the end of the projection lens.

3. A projector type headlamp according to claim 2, wherein the main reflecting mirror and the auxiliary reflecting mirror are formed integral with each other, the expansion reflecting mirrors and a holder portion for the projection lens are formed integral with each other, and both of the integrated units are connected to each other to assemble the projector type headlamp.

4. A projector type headlamp comprising a light source, an elliptical main reflecting mirror, a shade, and a projection lens, wherein an auxiliary reflecting mirror having a parabolic reflecting surface which has a focus where the light source is provided and a radiation direction which is almost horizontal is provided in a position outside the outer periphery of the projection lens and extends from the main reflecting mirror to the vicinity of the end of the projection lens.

* * * * *